US011457364B2

(12) United States Patent
Thivierge, Jr. et al.

(10) Patent No.: US 11,457,364 B2
(45) Date of Patent: Sep. 27, 2022

(54) WIRELESS CHANNEL PIN KEY REVOCATION AND RENEWAL

(71) Applicant: Ford Global Technologies, LLC, Dearborn, MI (US)

(72) Inventors: Timothy Thivierge, Jr., Carleton, MI (US); Tom Nelson, Plymouth, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/919,215

(22) Filed: Jul. 2, 2020

(65) Prior Publication Data
US 2022/0007178 A1 Jan. 6, 2022

(51) Int. Cl.
*H04W 12/50* (2021.01)
*H04W 12/47* (2021.01)
(Continued)

(52) U.S. Cl.
CPC ........ *H04W 12/50* (2021.01); *G07C 9/00309* (2013.01); *H04W 12/03* (2021.01);
(Continued)

(58) Field of Classification Search
CPC ....... H04W 4/80; H04W 12/06; H04W 12/50; H04W 12/0433; H04W 12/03
See application file for complete search history.

(56) References Cited

U.S. PATENT DOCUMENTS 9,125,028 B2    9/2015 Perner
9,875,589 B1 *  1/2018 Buttolo ................. G08G 1/202
(Continued)

FOREIGN PATENT DOCUMENTS

DE    102013225742 A1 *  6/2014  ......... G07C 9/00309

OTHER PUBLICATIONS

Faraaz, S. M., Naik, B. B., & Singh, D. (Jul. 2018). Automatic Remote Car Locker Using Bluetooth Low Energy Wireless Communication. In International Conference on Computational Intelligence, Communications, and Business Analytics (pp. 479-491). Springer, Singapore.*

(Continued)

*Primary Examiner* — Lizbeth Torres-Diaz
(74) *Attorney, Agent, or Firm* — Frank Lollo; Eversheds Sutherland (US) LLP

(57) ABSTRACT

The present disclosure includes a system for re-establishing a Bluetooth Low Energy (BLE) pairing PIN key to repair a secure connection between a mobile device and vehicle. The system may detect an error state, and provide a prompt to the user to determine if they wanted to intentionally remove their account. Responsive to an affirmative response from the user that the removal of the connection credentials was intentional, the system may send a revoke request to a server associated with the vehicle. Responsive to a user input that indicates that the removal of the credentials was unintentional, the vehicle may fetch an encrypted PIN seed of the BLE pairing PIN from memory or request the PIN seed from the server. The PIN seed re-establishes the secured pairing of the mobile device and the vehicle infotainment system without undergoing a new device setup procedure.

15 Claims, 4 Drawing Sheets

(51) Int. Cl.
*H04W 12/0433* (2021.01)
*H04W 12/03* (2021.01)
*G07C 9/00* (2020.01)

(52) U.S. Cl.
CPC ....... *H04W 12/0433* (2021.01); *H04W 12/47* (2021.01); *G07C 2009/005* (2013.01)

(56) References Cited

U.S. PATENT DOCUMENTS

| | | | |
|---|---|---|---|
| 10,187,793 B2* | 1/2019 | Petel | H04L 63/18 |
| 11,128,478 B2* | 9/2021 | Galdo | H04L 9/0841 |
| 11,347,876 B2* | 5/2022 | Ducatel | G06F 21/10 |
| 2007/0143615 A1* | 6/2007 | Hiitola | H04M 1/72412 |
| | | | 713/172 |
| 2016/0142177 A1* | 5/2016 | Chou | H04W 28/0205 |
| | | | 370/329 |
| 2019/0090115 A1* | 3/2019 | Yamada | H04W 12/50 |
| 2020/0052905 A1* | 2/2020 | Mathias | H04L 9/3263 |
| 2021/0058778 A1* | 2/2021 | Graessley | H04W 12/50 |
| 2021/0297270 A1* | 9/2021 | Bauer | G07C 9/00309 |
| 2021/0377100 A1* | 12/2021 | Chavan | H04L 41/0654 |
| 2022/0019494 A1* | 1/2022 | R | H04L 41/22 |

OTHER PUBLICATIONS

Ford Motor Company, "How To Reverse Pair Your Phone", published 2019, 4 pages.
Dave Taylor, "Fast Way To Delete A Phone From Nissan Car Bluetooth System?", published May 1, 2019, 4 pages.

* cited by examiner

WIRELESS CHANNEL PIN KEY REVOCATION AND RENEWAL

TECHNICAL FIELD

The present disclosure relates to wireless communication encryption, and more particularly, to wireless channel personal identification number (PIN) revocation and renewal.

BACKGROUND

Mobile electronic devices configured to work as part of a Phone-as-a-Key (PaaK) vehicle system can establish a secure session with vehicles through the usage of link layer encryption. To achieve this, whenever a PaaK key request is made, the vehicle may transmit the link layer encryption information using encrypted packet transfer to the mobile device, which the mobile device uses to authenticate the mobile device with the vehicle. In conventional systems, the user may input a personal identification number (PIN) into the mobile device to establish a link layer. Once established, the link layer enters both connected devices into a "paired" state.

A user may inadvertently, or intentionally, delete the established connection information from the mobile device or the vehicle computer. Conventional systems do not provide a way to re-establish the lost connection between the mobile device and the vehicle without performing a new mobile device setup procedure and establishing a new secure PIN.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
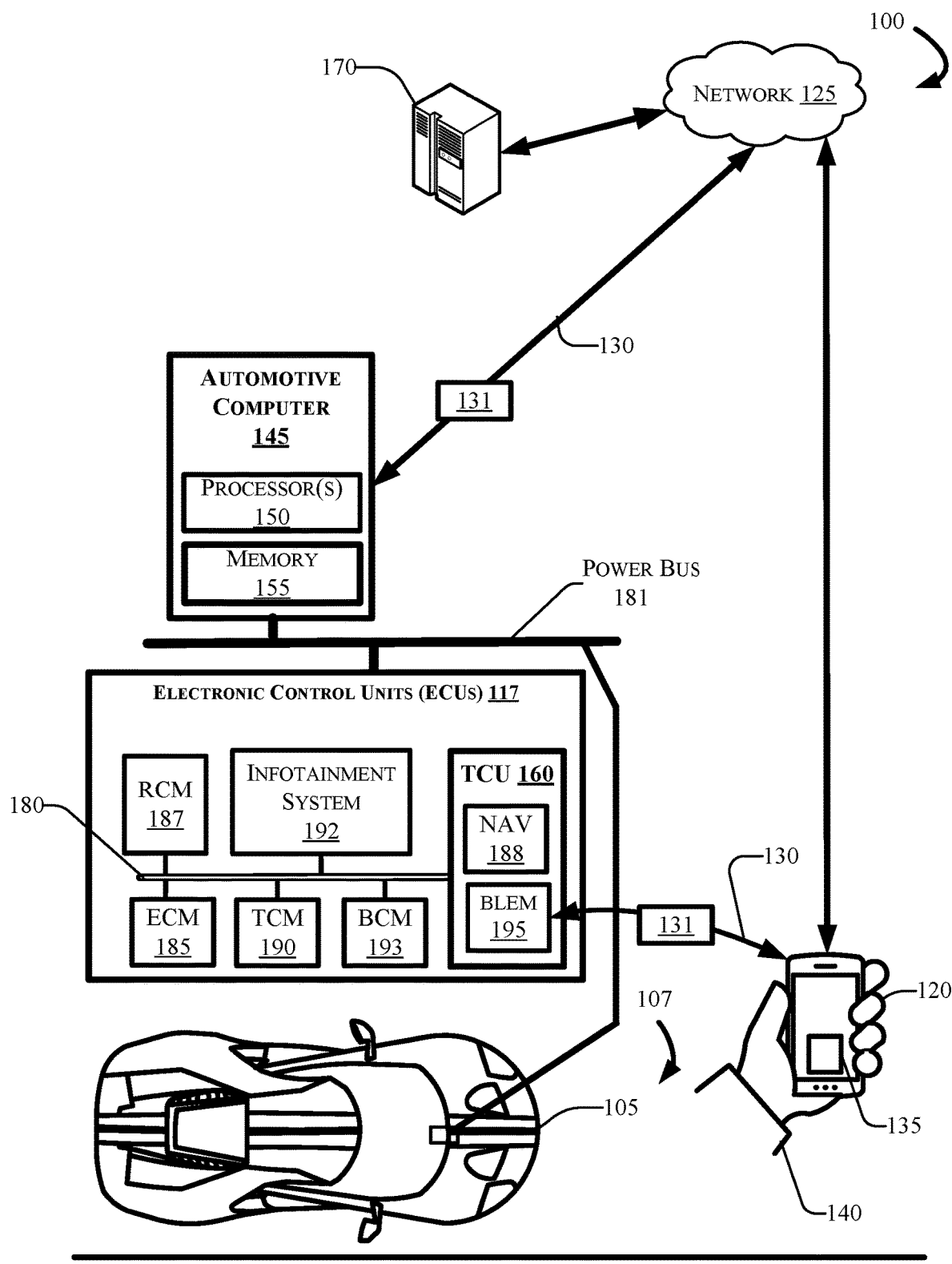
FIG. 1 depicts an example computing environment in which techniques and structures for providing the systems and methods disclosed herein may be implemented.

Mobile electronic devices configured to work as part of a Phone-as-a-Key (PaaK) vehicle system can establish a secure session with vehicles through the usage of a digital Consumer Access Key (CAK) and Bluetooth® Low Energy (BLE) link layer encryption. To achieve this, whenever a PaaK key request is made, the vehicle may transmit the CAK and necessary link layer establishment information using encrypted packet transfer. The PaaK device interface onboard the vehicle transmits the CAK to the mobile device, which the mobile device may use to authenticate with the vehicle. In conventional systems, the user may input a personal identification number (PIN) into the mobile device to establish a link layer. Once established, the link layer enters both connected devices into a "paired" state.

In some instances, the BLE pairing keys may not be found on one of the mobile device or the vehicle infotainment system. This may be intentional, where the user thought un-pairing would automatically delete their account, and removed the pairing keys from their mobile device. The missing keys may also be an undesired byproduct of user error, or wiping the network settings from the mobile device to resolve another issue (e.g., to remedy an erroneous Wi-Fi connection with mobile device diagnostic utility that cleared the BLE pairing keys).

This enters a problematic state where the user's phone can authenticate its presence but not use link layer encryption. For example, the mobile device may authenticate with the vehicle infotainment system, but then immediately disconnect without sufficient warning to the user. Due to the presence of the CAK, the vehicle will know the phone is trusted—however, the user will not be able to access the vehicle, nor perform any functionalities associated with the PaaK system. More importantly, the current PaaK implementation only allows for the user to be informed that their BLE connectivity needs to be repaired, and to delete their account and request another digital key prior to being able to unlock and access the vehicle.

This is an unnecessary nuisance simply because the BLE pairing PIN code has not been stored on the phone for security purposes. Assuming the user still has an account with a valid digital key, it is advantageous to allow the user to simply re-establish pairing with the vehicle's infotainment system via a direct process.

The systems and methods disclosed herein are configured to re-establish a BLE pairing PIN key to a mobile device in the event the user has unintentionally, or intentionally, removed the pairing information from either the mobile device or the infotainment system of a vehicle, but when the user still has an active account associated with the PaaK mobile device.

The method can include detecting this error state, and providing a prompt to the user to determine if they wanted to intentionally remove their account. Responsive to an affirmative response from the user that the removal of the connection credentials was intentional, the system may send a revoke request to a server associated with the vehicle infotainment system. In one aspect, the request may cause the server to transmit a response message to both the mobile device and the vehicle's infotainment system that causes the respective devices to remove the credentials on both the mobile device and the vehicle.

Responsive to a user input that indicates that the removal of the credentials was unintentional, the vehicle infotainment system may transmit a CAK (Consumer Access Key) encrypted PIN seed of the BLE pairing PIN, such that the user can utilize the newly generated PIN, re-establish pairing with the vehicle, and re-establish PaaK functionality between the mobile device and the vehicle infotainment system without undergoing a full new device setup procedure.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include one or more vehicle(s) 105 comprising an automotive computer 145, and a Telematics Control Unit (TCU) 160. A user 140 may operatively connect with the automotive computer 145 using a mobile device 120. The mobile device 120 may be communicatively coupled with the vehicle 105 via one or more network(s) 125, which may communicate via one or more encrypted channel(s) 130. The mobile device 120 generally includes a memory 155 for storing program instructions for an application 135 that, when executed by a mobile device processor (not shown in FIG. 1), performs aspects of the present disclosure. For example, the mobile device 120 may include a mobile device application 135 operable as part of the connection restoration system 107 (hereafter "system 107") that may be configured to re-establish connectivity between the automotive computer 145 and the mobile device 120. The application 135 may also be part of the system 107.

The vehicle 105 may include an automotive computer 145, which may include one or more processor(s) 150 and memory 155. The vehicle 105 may further include the TCU 160, which may be disposed in communication with and/or be a part of the automotive computer 145. The TCU 160 may, in some example embodiments, be disposed in communication with the mobile device 120, and one or more server(s) 170, which may be associated with and/or include a Telematics Service Delivery Network (SDN).

Although illustrated as a passenger vehicle, the vehicle 105 may take the form of another passenger or commercial automobile such as, for example, a car, a truck, a sport utility vehicle, a crossover vehicle, a van, a minivan, a taxi, a bus, etc. Further, the vehicle 105 may be a manually driven vehicle, and/or be configured to operate in a fully autonomous (e.g., driverless) mode or partially autonomous mode.

According to an example embodiment, a user 140 may control the application 135 (hereafter the application 135") operating on the mobile device 120 to transmit connection requests to the vehicle infotainment system that wirelessly connect with the mobile device 120.

In some aspects, the mobile device 120 may communicate with the vehicle 105 through the one or more encrypted channel(s) 130, which may be encrypted and established between the mobile device 120 and the TCU 160. The mobile device 120 may communicate with the TCU 160 using a wireless transmitter associated with the TCU 160 on the vehicle 105. The transmitter may communicate with the mobile device 120 using a wireless communication network such as, for example, the one or more network(s) 125. The encrypted channel(s) 130 are depicted in FIG. 1 as communicating via the one or more network(s) 125.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The connection restoration system 107 system may be disposed in communication with and/or include a plurality of Electronic Control Units (ECUs) 117 configured to provide system-level and device-level vehicle control of the vehicle 105. The ECUs 117 may share a common power bus 181 with the automotive computer 145 connection restoration system 107, and can include, for example, an infotainment system 192, a Body Control Module (BCM) 193, an Engine Control Module (ECM) 185, a Transmission Control Module (TCM) 190, a Telematics Control Unit (TCU) 160, and a Restraint Control Module (RCM) 187, among other electronic control units. In some aspects, the ECUs 117 may control aspects of the vehicle 105 through the control modules 185, 187, 190, 193, 195, etc., and implement one or more instruction sets received from the application 135 operating on the mobile device 120.

The TCU 160 may include a Navigation/GPS receiver 188 and/or a Bluetooth® Low-Energy Module (BLEM) 195, and/or other control modules. The TCU 160 may provide communication and control access between ECUs 117 using a Controller Area Network (CAN) bus 180, by retrieving and sending data from the CAN bus 180, and coordinating the data between vehicle 105 systems, connected servers (e.g., the server(s) 170), and other vehicles (not shown in FIG. 1) operating as part of a vehicle fleet.

The BLEM 195 may establishes a secure session with a Phone-as-a-Key (PaaK)-enabled device through the usage of a digital Consumer Access Key (CAK) and BLE link layer encryption. Accordingly, the BLEM 195 may establish wireless communication with the mobile device 120 using Bluetooth® communication protocols by broadcasting and/or listening for broadcasted small advertising packets, and establishing connections with responsive devices (e.g., the mobile device 120) that may be configured according to embodiments described herein. For example, the BLEM 195 may include Generic Attribute Profile (GATT) device connectivity for client devices, including the mobile device 120, for example, that respond to or initiate GATT commands and requests, such as a PaaK key request. To achieve this, whenever a PaaK key request is made, the CAK and necessary link layer establishment PIN are transmitted by the BLEM 195 to the mobile device 120 via an encrypted channel(s) 130. The encrypted channel(s) 130 may carry the encrypted packet 131 from the server(s) 170 to the automotive computer 145 and/or the TCU 160.

The CAN bus 180 may be configured as a multi-master serial bus standard for connecting two ECUs as nodes using a message-based protocol that can be configured and/or programmed to allow the ECUs 117 to communicate with each other. The CAN bus 180 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may use a linear bus configuration. In some aspects, the ECUs 117 may communicate with a host computer (e.g., the automotive computer 145 and/or the server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance.

The ECUs 117, when configured as nodes in the CAN bus 180, may each include a central processing unit, a CAN controller, and a transceiver (not shown in FIG. 1). In an example embodiment, the ECUs 117 may control aspects of vehicle operation and communication based on inputs from human drivers, an autonomous vehicle controller, and wireless signal inputs, among others.

The BCM 193 may include processor-based power distribution circuitry that can supervise, and control, functions related to the car body such as lights, windows, security, door locks and access control, and various comfort controls. The central BCM 193 may also operate as a gateway for bus and network interfaces to interact with remote electronic control units (ECUs) for other systems. The ECUs 117 may control various loads directly via the CAN bus 180 communication or BCM 193.

The BCM 193 may generally include integration of sensors, vehicle performance indicators, and variable reactors associated with vehicle systems. The BCM 193 may coordinate a wide range of functions including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality.

The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The ECUs 117 are described for exemplary purposes only, and are not intended to be limiting or exclusive. Control and/or communication with other control modules not shown in FIG. 1 is possible, and such control is contemplated.

The automotive computer 145 may include one or more processor(s) 150 and a computer-readable memory 155. The automotive computer 145 may be installed in an engine compartment of the vehicle 105 (or elsewhere in the vehicle 105) as part of a connection restoration system 107, in accordance with the disclosure. The automotive computer 145 may include, in one example, the one or more processor(s) 150, and a computer-readable memory 155. In other example embodiments, the TCU 160 may be integrated with and/or be incorporated with the automotive computer 145. The computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing connection restoration between the BLEM 195, and more particularly, the BLE pairing pin seed in accordance with the disclosure. The memory 155 may be a non-transitory computer-readable memory. The processor(s) 150 may be configured to execute computer-executable instructions stored in the memory 155 for performing various functions of the connection restoration system 107, as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the ECUs 117.

The memory 155 may store various code modules such as, for example, a secure communication controller (not shown in FIG. 1) for establishing the one or more channel(s) 130 (which may, in some embodiments, be encrypted channel(s)) between the mobile device 120, the TCU 160, and/or the automotive computer 145. The memory 155 may also receive the one or more instruction sets such as, for example, the encrypted packet 131.

Figure 2:
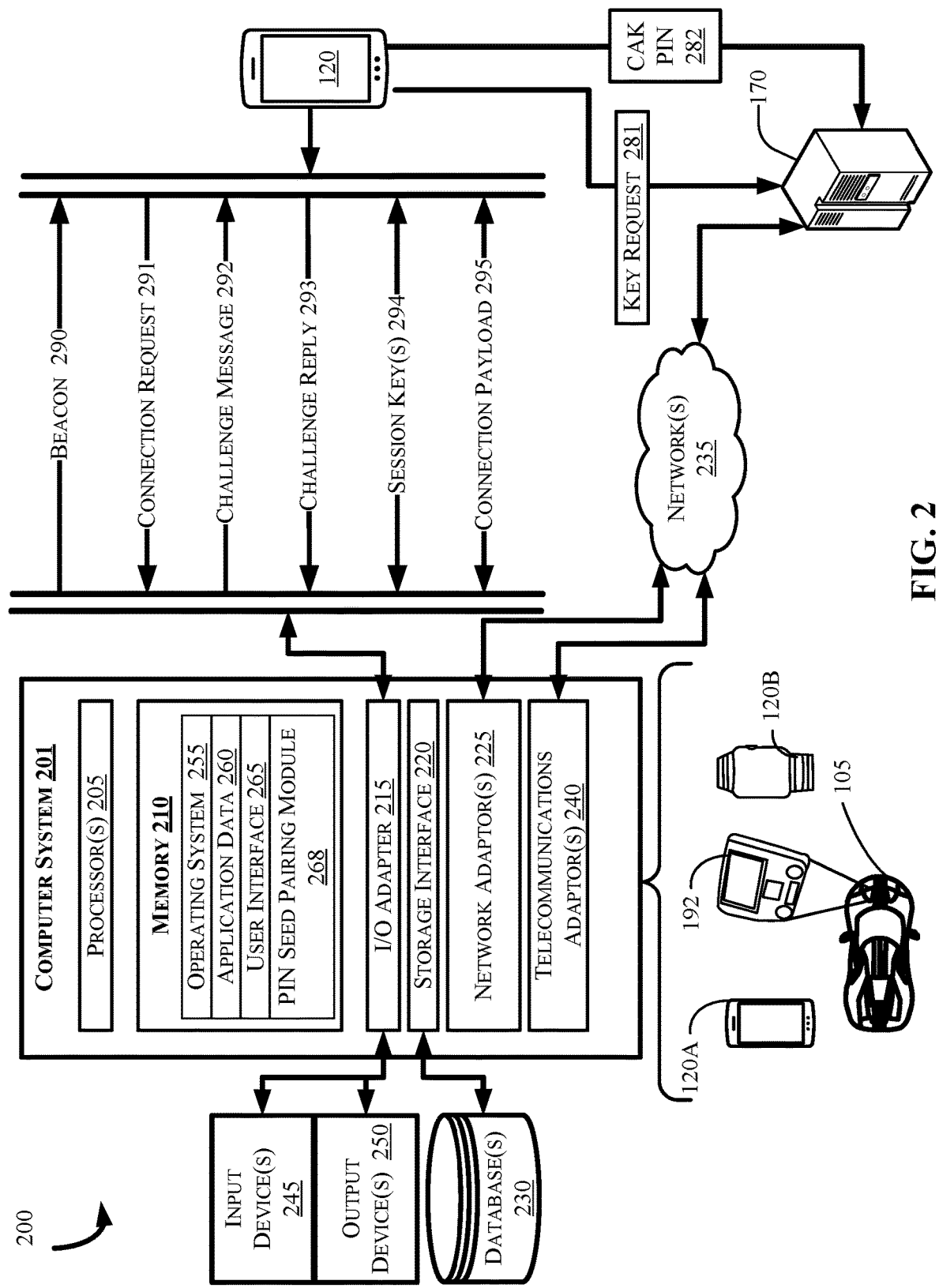
FIG. 2 illustrates a block diagram of an exemplary computing environment and computer system for use in practicing the embodiments described herein.

FIG. 2 illustrates a block diagram of an exemplary computing environment 200, which may include a computer system 200 for use in practicing the embodiments described herein. The environment and system described herein can be implemented in hardware, software (e.g., firmware), or a combination thereof. The computer system 201 may be representative of one or more of the computing systems depicted with respect to FIG. 1. For example, the computer system 201 may be substantially similar or identical to the automotive computer 145 depicted in FIG. 1.

The computer system 201 may be implemented in a device that is separate from but communicatively coupled to one or more vehicle telematic devices such as the telematics system located in the vehicle 105. Some examples of the telematics system can include the infotainment system 192 mounted on a dashboard of the vehicle 105, the BLEM 195 (not shown in FIG. 2) or another radio communications device mounted in the vehicle 105. Examples of various embodiments for the mobile device 120 can include a personal device such as a smartphone 120A carried by the user 140 (as shown in FIG. 1) or another occupant of the vehicle 105, or a portable computing device such as a wearable smart device 120B.

The computer system 201 may include the one or more processor(s) 205, memory 210 communicatively coupled to the one or more processor(s) 205, and one or more input/output adaptors 215 that can communicatively connect with external devices such as, for example, input devices 245 and/or output devices 250. The computer system 201 may operatively connect to and communicate information with one or more internal and/or external memory devices such as, for example, one or more databases 230 via a storage interface 220. The computer system 201 may also include one or more network adaptor(s) 225 enabled to communicatively connect the computer system 201 with one or more networks(s) 235. In one embodiment, the computer system 201 can include one or more telecommunications network(s) for communication between the computer system 201 and any external device. In such embodiments, the computer system 201 can further include one or more telecommunications adaptor(s) 240.

The one or more processor(s) 205 are collectively a hardware device for executing program instructions (aka software), stored in a computer-readable memory (e.g., the memory 210). The one or more processor(s) 205 can be a custom made or commercially-available processor, a central processing unit (CPU), a plurality of CPUs, an auxiliary processor among several other processors associated with the computer system 201, a semiconductor-based microprocessor (in the form of a microchip or chip set), or generally any device for executing computer instructions.

The one or more processor(s) 205 may be disposed in communication with one or more memory devices (e.g., the memory 210 and/or one or more external databases 230, etc.) via a storage interface 220. The storage interface 220 can also connect to one or more memory devices including, without limitation, one or more databases 230, and/or one or more other memory drives (not shown in FIG. 2) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 210 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 210 can include one or more separate programs, each of which can include an ordered listing of computer-executable instructions for implementing logical functions. In the example of FIG. 2, the instructions in the memory 210 can include an operating system 255. The operating system 255 can control the execution of other computer programs such as, for example the connection restoration system 107, and provides scheduling, input-output control, file and data management, memory management, and communication control and related services.

The program instructions stored in the memory 210 can further include application data 260, and instructions for controlling and/or interacting with the computer through a user interface 265.

The memory 210 can also include program instructions for a PIN seed pairing module 268, which may be configured to perform aspects of the present disclosure, such as receiving, from a mobile device 120, a connection request at the vehicle infotainment system of the vehicle 105, determining that the mobile device pairing is not established between the mobile device 120 and the vehicle infotainment system 192, and pairing the mobile device 120 with the vehicle infotainment system 192 using a personal identification number (PIN) seed sent as the encrypted packet 131 described with respect to FIG. 1.

The I/O adaptor 215 can connect a plurality of input devices 245 to the computer system 201. The input devices can include, for example, a keyboard, a mouse, a joystick, a microphone, a sensor, etc. The input device(s) 245 may also include one or more virtual keyboard(s) on a touchscreen interface, or another conventional input device.

The I/O adaptor 215 can also connect a plurality of output device(s) 250, which can include, for example, a display, a speaker, a touchscreen, etc. Other output devices can also be included, although not shown in FIG. 2.

Finally, the I/O devices 245 and 250 that may be connectable to the I/O adaptor 215 can further include devices that communicate both inputs and outputs, for instance but are not limited to, a network interface card (NIC) or modulator/demodulator (for accessing other files, devices, systems, or a network), a radio frequency (RF) or other transceiver, a Near Field Communication (NFC) device, a Bluetooth® Low energy receiver such as the BLEM 195 as shown in FIG. 1, an ad-hoc networking device, a bridge, a router, etc.

The computer system 201 can include one or more telecommunications adaptor(s) 240 that may be disposed in communication with mobile telecommunications infrastructure such as, for example, mobile phone towers, satellites, vehicle-to-vehicle network infrastructure, etc. The telecommunications adaptor(s) 240 can also include and/or be disposed in communication with one or more other adaptors configured to transmit and/or receive cellular, mobile, and/or other communications protocols for wireless communication.

The telecommunications adaptor 240 may couple the computer system 201 to one or more network(s) 235. The network(s) 235 may be substantially similar to or identical to the network(s) 125 (depicted in FIG. 1).

The computer system 201 may transmit and receive data between the network(s) 235 and devices and/or systems external to the computer system 201, such as mobile device 120. For example, the computer system 201 may cause the BLEM 195 to send and receive PIN code information, encryption requests, vehicle identification information, mobile device identification information, etc. between the computer system 201 and the mobile device 120.

The network(s) 235 can operatively connect the computer system 201 to one or more devices including, for example, one or more server(s) 270. The server(s) 270 may be substantially similar or identical to the server(s) 170 depicted with respect to FIG. 1. The networks(s) 235 may also be disposed in communication with one or more mobile devices 120A and/or 120B, which may be substantially similar to and/or identical to the mobile device 120 depicted with respect to FIG. 1.

The memory 210 can also include program instructions for the mobile device application 135 including, for example, the PIN seed pairing module 268. In some aspects, the application 135 may also control functionality of a low-energy signal transmitting device such as, for example, a Bluetooth® transmitter embodied as the I/O adaptor 215. In some aspects, the instructions may cause the I/O adaptor 215 to transmit a beacon probe request 290 to the mobile device 120. The beacon probe request 290 may be configured as an inquiry packet. In other aspects the I/O adaptor 215 may function in an unconnected state (e.g., standby mode), and switch into an inquiry mode at predetermined intervals to "listen" for broadcasting of low-energy signals associated with other users of the application 135. Receiving device nodes (e.g., the mobile device 120) and sending device nodes (e.g., the computer system 201) may both function as transmitting nodes such that any one of them may broadcast the beacon signal, or function as receiving nodes that receive the beacon probe request 290 and send response signals to establish secure channels. In the present example of FIG. 2, the mobile device 120 may run the application 135 and function as the receiving node, and the computer system 201 may function as the transmitting node to broadcast the beacon probe request 290.

The mobile device 120 may be configured as part of a Phone-as-a-Key (PaaK) system associated with the vehicle 105. As a PaaK-enabled smart device, the mobile device 120 may establish a secure session with the vehicle 105 (e.g., via the encrypted wireless channel(s) 130) through the usage of a digital Consumer Access Key (CAK) and BLE link layer encryption. To achieve this, mobile device 120 may transmit a PaaK key request 281 to the server(s) 170 that request the CAK and necessary link layer establishment PIN credentials. The mobile device 120 may receive the CAK and PIN credentials 282 from the server(s) 170 if the mobile device 120 authenticates a valid user account with the server(s) 170. The server(s) 170 may transmit the CAK to the mobile device 120 via the encrypted channel(s) (e.g., the wireless channel(s) 130 as shown in FIG. 1). The mobile device 120 may transmit the CAK to the vehicle 105, which is then used by the automotive computer 145 (and more particularly, the BLEM 195) to authenticate the mobile device 120 with the vehicle 105. The user 140 may receive a prompt via the mobile device 120 to enter the user inputs that include the PIN. The mobile device 120 may then process user input of the user PIN to enable the mobile device to enter a "paired" state and establish a secure session with the vehicle computer 145.

When operating as the transmitting node, the program instructions on the sending device (e.g., the computer system 201) may cause the processor(s) 205 to transition between protocol sequence states for establishing a link layer connection between the computer system 201 and the mobile device 120. The sequence states, depicted in FIG. 2 as states 290-297, may include, for example, broadcasting the inquiry packet configured as the beacon probe request 290 using the I/O adaptor 215.

The processor(s) 205 may broadcast the beacon probe request 290, which may be a beacon probe that advertises the available vehicle connection using the transceiver (e.g., the I/O adaptor 215). Whenever the user 140 has a valid PaaK account, and more particularly, whenever the mobile device 120 is associated with a valid account, the mobile device 120 may respond to the connectable advertisement (e.g., the beacon probe request associated with the beacon probe request 290) with a comparison of the vehicle universally unique ID (i.e., the UUID which is the "Universally Unique Identifier"). If the UUID matches a known account, a connection request shall be made; if not, the packet is ignored.

For example, the mobile device 120 (e.g., the receiving node) may return an inquiry response that includes a connection request 291 indicative of a device local name of the mobile device acting as the receiving node, and a service class universally unique identifier (UUID) for services supported by the receiving node. The mobile device 120 may also send the CAK and PIN seed with the UUID. The service class UUID may include one or more values that identify a type of service/functionality provided by the responding node. The connection request 291 may also include a vehicle identification (ID), and/or transmission power information in the form of a single byte value indicative of signal power level of the BLE signal. The connection request 291 may further include, for example, a Received Signal Strength Indicator (RSSI) that may be usable by the computer system 201 to calculate path loss, provide an estimate of which of two or more responding devices is physically closer to the inquiring device (e.g., the computer system 201), or perform other procedures according to embodiments described herein. Other information not discussed herein may be sent as part of the connection request 291.

In the link layer establishment state, responsive to the connection request 291, the computer system 201 may send a reply packet that can include a challenge message 292 for authentication of the link layer. The challenge message may include a salt, a nonce, encoding information, etc.

The mobile device 120 may transmit a challenge reply 293. Responsive to determining that the challenge reply 293 includes expected reply credentials, the mobile device 120 and the computing system 201 may exchange session keys 294, which may include seed credentials for establishing the link layer and begin a bonded session. The bonded session may provide encrypted data channel(s) for delivering a connection payload 295 as described according to embodiments.

The computer system 201 may determine that the mobile device pairing is not established between the mobile device and the vehicle infotainment system if the BLE pairing keys are not received from the mobile device 120. In some aspects, the PIN seed may be sent with the CAK at the initial key delivery. In other aspects, when the PIN seed was not delivered with the CAK at the initial key delivery, responsive to determining that the mobile device pairing is not established between the mobile device 120 and the computer system 201, the computing system 201 may submit an encryption request (not shown in FIG. 2) to the server(s) 170, that request a PIN seed. The computing system 201 may determine that the copy of the CAK is not stored on the mobile device 120 responsive to not receiving a link layer encryption request during exchange of the session key(s) 294, from the mobile device 120 after a period of time. The server(s) 170 may send the PIN seed to the mobile device 120, and/or to the computing system 201 responsive to the request for the PIN seed.

Figure 3:
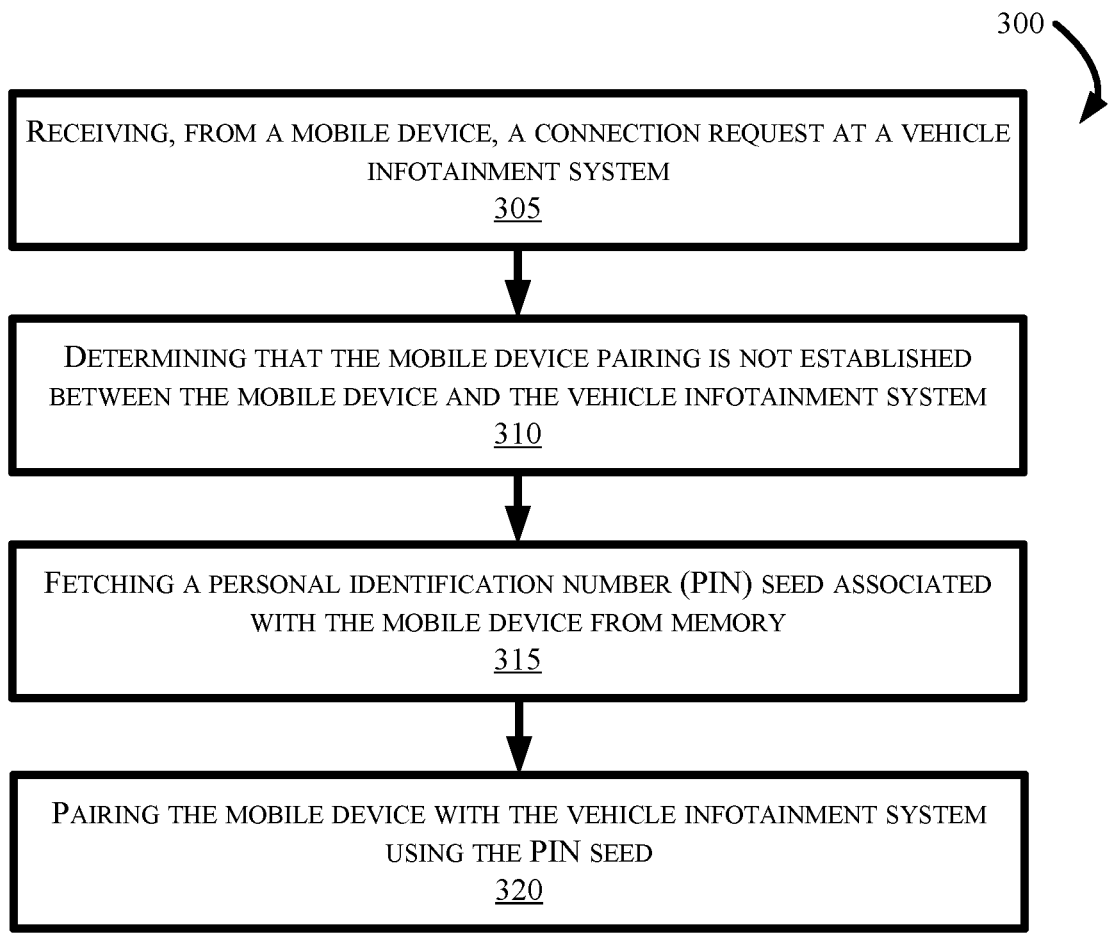
FIGS. 3 and 4 depict flow diagrams for performing a method in accordance with the present disclosure.
Figure 4:
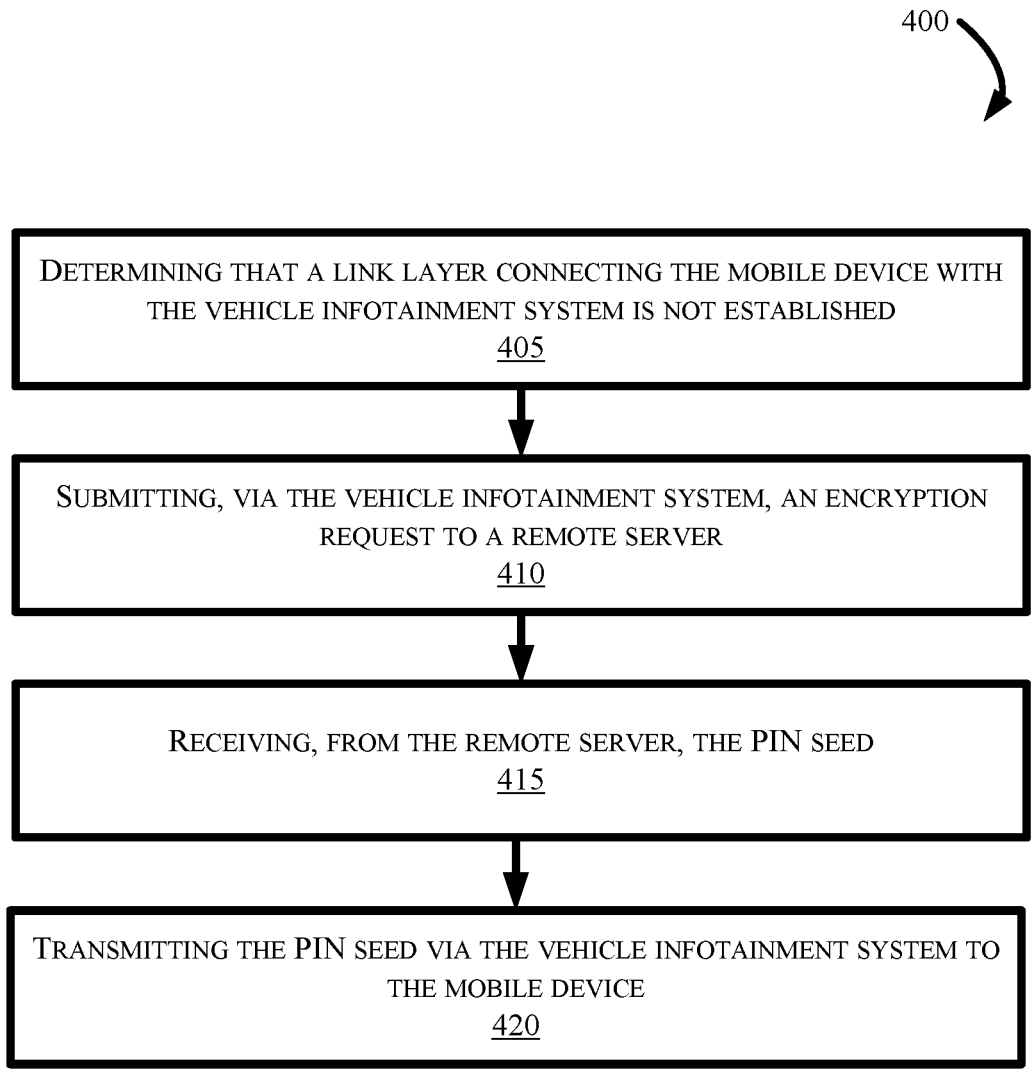

FIG. 3 is a flow diagram of an example method 300 for pairing a mobile device with a vehicle infotainment system, according to the present disclosure. FIG. 4 describes several steps that may be included in a procedure for pairing the mobile device with the vehicle infotainment system (e.g., as depicted at step 320 of FIG. 3). FIGS. 3 and 4 may be described with continued reference to prior figures, including FIGS. 1-2. The following process is exemplary and not confined to the steps described hereafter. Moreover, alternative embodiments may include more or less steps than are shown or described herein, and may include these steps in a different order than the order described in the following example embodiments.

Referring first to FIG. 3, at step 305, the method 300 may commence with receiving, from the mobile device 120, a connection request at a vehicle infotainment system.

Next, the method includes a step 310 of determining that the mobile device 120 pairing is not established between the mobile device 120 and the vehicle infotainment system 192. This step may be accomplished using various thresholds or tests that indicate that the connection is not established. For example, the computing system 201 may determine that the copy of the CAK is not stored on the mobile device 120 responsive to not receiving a link layer encryption request during exchange of the session key(s) 294, from the mobile device 120 after a period of time. In other aspects, the mobile device 120 may transmit a message indicating that the link layer is not established. In yet another example, the mobile device 120 may simply sever the BLE connection.

At step 315, the method may include a step of fetching a personal identification number (PIN) seed associated with the mobile device from memory responsive to determining that the mobile device pairing is not established. The vehicle memory may store the PIN seed in a secure memory location of the memory 155. In one aspect, the processor(s) 150 may store the PIN in the persistent memory during the setup operation that connected the mobile device 120 with the vehicle 105. In another embodiment, the PIN seed may not be stored in the memory 155, but instead may be requested from the server(s) 170.

At step 320, the method 300 may further include pairing the mobile device 120 with the vehicle infotainment system 192 using a personal identification number (PIN) seed. In one embodiment, the PIN seed is associated with a Bluetooth® Low Energy (BLE) pairing PIN code associated with the mobile device 120 and the vehicle infotainment system 192 of the vehicle 105. The PIN seed may include a cryptographic representation of a PIN code associated with the mobile device 120. The pairing steps as described herein are considered in greater detail with respect to FIG. 4.

FIG. 4 describes a method flow diagram 400 for establishing a secured connection between the mobile device 120 and the computing system 201. At step 405, the method includes determining that a link layer connecting the mobile device 120 with the vehicle infotainment system 192 is not established and at step 410, submitting, via the vehicle infotainment system 192, an encryption request to a server(s) 170.

At step 415, the method may include the step of receiving the PIN seed from the server(s) 170 in response to the system request. For example, the BLEM 195 (as shown in FIG. 1) may send a message to the mobile device 120 indicating the authenticated session requires re-establishing the link layer encryption keys. This can result in the mobile device 120 presenting a notification via a display on the mobile device to the user 140 that pairing has been lost, and further present a request for user input to indicate whether the mobile device 120 was or was not intentionally unpaired with the vehicle infotainment system 192. In other aspects, the mobile device 120 may ask the user 140 if they had intended to remove their account (e.g., whether the user 140 thought their account was removed by simply by un-pairing from the BLEM 195). The mobile device 120 may present the user response prompts, and receive user input indicative that the mobile device 120 is not intentionally unpaired with the vehicle infotainment system. Responsive to an indication that removing the mobile device was intentional, the mobile device may prompt the user to enter input indicative of whether the user wishes for the system to revoke the user account. When the user enters input that indicates an intention to revoke the account, the mobile device 120 may send a revoke confirmation message to the server(s) 170 indicating such a desire to revoke the account, and the server(s) 170 can purge the user account according to the user instruction.

At step 420, the method may include the step of transmitting the PIN seed via the vehicle infotainment system to the mobile device 120. If the user 140 provides user input indicative that the account was not intended to be removed, the vehicle 105 may generate a PIN seed of the BLE pairing PIN, which is encrypted by the CAK, and transmit it to the mobile device 120. The mobile device 120 may decrypt and generate the PIN for presentation to the user 140. Accordingly, the user 140 may pair the mobile device 120 with the vehicle 105 using the BLE pairing PIN.

Responsive to a user response that the mobile device 120 was intentionally unpaired from the vehicle 105, the mobile device 120 may send a revoke request to the server(s) 170. The server(s) 170 may transmit instructions to the mobile device 120 and/or the vehicle 105 for account removal on both ends. Accordingly, responsive to the removal message from the server(s) 170, the CAK is removed from the mobile device 120 and the BLEM 195.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving, via a processor and from a mobile device, a connection request at a wireless transceiver module associated with a vehicle,
determining that a mobile device pairing is not established between the mobile device and the vehicle by
searching the vehicle for a Consumer Access Key (CAK),
responsive to determining that the CAK is not found on the vehicle, transmitting, to the mobile device, a request for the CAK from the mobile device, and
determining that the mobile device pairing is not established between the mobile device and the vehicle responsive to determining that a copy of the CAK is not stored on the mobile device;
fetching, based on the determination that the mobile device pairing is not established, a personal identification number (PIN) seed associated with the mobile device from memory; and
pairing, based on the fetching of the PIN seed, the mobile device and the vehicle using the PIN seed.

2. The method according to claim 1, wherein the PIN seed comprises a cryptographic representation of a PIN code associated with the mobile device.

3. The method according to claim 1, wherein responsive to determining that the mobile device pairing is not established between the mobile device and the vehicle: determining that a link layer connecting the mobile device with the vehicle is not established; submitting, via the vehicle, an encryption request to a server; receiving, from the server, the PIN seed; and transmitting the PIN seed via the vehicle to the mobile device.

4. The method according to claim 3, further comprising: responsive to determining that the mobile device pairing is not established between the mobile device and the vehicle, receiving user input indicative that the mobile device is not intentionally unpaired with the vehicle, and submitting, via the vehicle, and based on the user input, the encryption request to the server.

5. The method according to claim 1, wherein transmitting the request for the CAK comprises: sending an encrypted session request to the mobile device via the vehicle; and determining, via the vehicle, that the copy of the CAK is not stored on the mobile device responsive to not receiving a link layer encryption request from the mobile device after a period of time.

6. The method according to claim 5, further comprising receiving user input indicative that the mobile device is not intentionally unpaired with the vehicle.

7. The method according to claim 6, wherein determining that the mobile device pairing is not established between the mobile device and the vehicle comprises: determining, via the vehicle, that a pairing of the vehicle and the mobile device has been lost; determining that the CAK was deleted from mobile device; determining, responsive to the CAK being deleted from the mobile device, that the deletion was intentional; and purging the CAK via the vehicle responsive to determining that the user intends to revoke a user account associated with the CAK.

8. A system, comprising:
a processor; and
a memory for storing executable instructions, the processor configured to execute the instructions to:
receive, from a mobile device, a connection request at a wireless transceiver module associated with a vehicle;
determine that a mobile device pairing is not established between the mobile device and the vehicle by searching the vehicle for a Consumer Access Key (CAK),
responsive to determining that the CAK is not stored on the vehicle, transmitting, to the mobile device, a request for the CAK from the mobile device, and
determining that the mobile device pairing is not established between the mobile device and the vehicle responsive to determining that a copy of the CAK is not stored on the mobile device;
fetch, based on the determination that the mobile device pairing is not established, a personal identification number (PIN) seed associated with the mobile device from the memory; and
establish an encrypted connection, based on the fetch of the PIN seed, between the mobile device and the vehicle using the PIN seed.

9. The system according to claim 8, wherein the PIN seed comprises a cryptographic representation of a PIN code associated with the mobile device.

10. The system according to claim 8, wherein responsive to determining that the mobile device pairing is not established between the mobile device and the vehicle, the processor is further configured to execute the instructions to: determine that a link layer connecting the mobile device with the vehicle is not established; submit, via the vehicle, an encryption request to a server: receive, from the server, the PIN seed; and transmit, the PIN seed via the vehicle to the mobile device.

11. The system according to claim 8, wherein responsive to determining that the mobile device pairing is not established between the mobile device and the vehicle, the processor is further configured to execute the instructions to: receive user input indicative that the mobile device is not intentionally unpaired with the vehicle, and submit, via the vehicle, and based on the user input, an encryption request to a server.

12. The system according to claim 8, wherein the processor is further configured to execute the instructions to: send an encrypted session request to the mobile device via the vehicle; and determine, via the vehicle, that the copy of the CAK is not stored on the mobile device responsive to not receiving a link layer encryption request from the mobile device after a period of time.

13. The system according to claim 12, wherein the processor is further configured to execute the instructions to: receive user input indicative that the mobile device is not intentionally unpaired with the vehicle.

14. A non-transitory computer-readable storage medium in a vehicle computer, the computer-readable storage medium having instructions stored thereupon which, when executed by a processor, cause the processor to:
receive, from a mobile device, a connection request at a wireless transceiver module, determine that a mobile device pairing is not established between the mobile device and the vehicle by
searching the vehicle for a Consumer Access Key (CAK),
responsive to determining that the CAK is not stored on the vehicle, transmitting, to the mobile device, a request for the CAK from the mobile device, and
determining that the mobile device pairing is not established between the mobile device and the vehicle responsive to determining that a copy of the CAK is not stored on the mobile device;
fetch, based on the determination that the mobile device pairing is not established, a personal identification number (PIN) seed associated with the mobile device from memory; and
establish an encrypted connection, based on the fetch of the PIN seed, between the mobile device and the vehicle using the PIN seed.

15. The non-transitory computer-readable storage medium of claim 14, wherein the PIN seed comprises a cryptographic representation of a PIN code associated with the mobile device.

\* \* \* \* \*